(12) United States Patent
Simonazzi

(10) Patent No.: US 7,523,333 B2
(45) Date of Patent: Apr. 21, 2009

(54) POWER SUPPLY APPARATUS FOR ELECTRICAL AND/OR ELECTRONIC USER DEVICES

(76) Inventor: Giuseppe Simonazzi, Via Boccaccio, 2/1, 42100 Reggio Emilia (IT)

( * ) Notice: Subject to any disclaimer, the term of this patent is extended or adjusted under 35 U.S.C. 154(b) by 363 days.

(21) Appl. No.: 11/290,594

(22) Filed: Dec. 1, 2005

(65) Prior Publication Data

US 2006/0119183 A1 Jun. 8, 2006

(30) Foreign Application Priority Data

Dec. 7, 2004 (IT) .......................... MO2004A0325

(51) Int. Cl.
G06F 1/26 (2006.01)
G06F 1/32 (2006.01)
H02J 1/10 (2006.01)

(52) U.S. Cl. ...................... 713/323; 713/300; 713/320; 713/324; 713/330; 713/340; 307/43

(58) Field of Classification Search ................. 713/300, 713/320, 323, 324, 330, 340; 307/43
See application file for complete search history.

(56) References Cited

U.S. PATENT DOCUMENTS

| | | | | |
|---|---|---|---|---|
| 6,121,695 | A * | 9/2000 | Loh ............................. | 307/64 |
| 6,404,075 | B1 * | 6/2002 | Potter et al. .................... | 307/64 |
| 6,496,394 | B2 * | 12/2002 | Hanaoka et al. ................ | 363/71 |
| 7,269,751 | B2 * | 9/2007 | Janakiraman et al. ........ | 713/323 |
| 2003/0023888 | A1 * | 1/2003 | Smith et al. .................. | 713/300 |
| 2004/0010649 | A1 * | 1/2004 | Weaver et al. ............... | 710/302 |
| 2004/0177283 | A1 * | 9/2004 | Madany et al. .............. | 713/300 |
| 2006/0072283 | A1 * | 4/2006 | Thompson et al. .......... | 361/600 |

* cited by examiner

Primary Examiner—Thomas Lee
Assistant Examiner—Fahmida Rahman
(74) Attorney, Agent, or Firm—Browdy and Neimark P.L.L.C.

(57) ABSTRACT

A power supply apparatus for electrical and/or electronic user devices, comprising an uninterruptible power supply which can be connected electrically to at least one primary power source, to at least one secondary power source, and to one or more electrical and/or electronic user devices to which the electric power originated from the power sources is to be delivered, the uninterruptible power supply comprising an electric current management unit for connecting electrically the primary power source to the user devices to deliver electric power up to a preset threshold value and to activate/deactivate the electrical connection of the secondary power source to the user devices to deliver remaining electric power absorbed by the user devices.

7 Claims, 3 Drawing Sheets

POWER SUPPLY APPARATUS FOR ELECTRICAL AND/OR ELECTRONIC USER DEVICES

The present invention relates to a power supply apparatus for electrical and/or electronic user devices.

BACKGROUND OF THE INVENTION

It is known that uninterruptible power supplies or UPSs are apparatuses capable of supplying electric power to connected user devices (output loads) when the main power supply line fails.

These apparatuses in practice are connected electrically to two separate and distinct power sources: on one side, the ordinary electrical mains and, on the other side, one or more batteries arranged in a series or parallel configuration.

However, known uninterruptible power supplies draw the power required by user devices from only one of these power sources and in particular from the electrical mains in normal operating conditions and from the batteries in emergency conditions.

The occurrence of these emergency conditions is often due to the fact that the ordinary electrical mains has supply limitations dictated by the user contracts, by the sizing of the supply facilities, and by the maximum power that can be delivered to a geographical area by the provider (ENEL).

These limitations, for example, prescribe that the absorbed power for home users is lower than 3.2 kW; exceeding this level entails the payment of higher rates by the user and in some cases entails disconnection due to overload of the mains supply and the beginning of the supply of power on the part of the batteries.

These traditional types of apparatus are not free from drawbacks, including the fact that in emergency conditions they are unable to supply a particularly large amount of energy for a very long and continuous period of time. In such circumstances they must in fact provide on their own the total energy requirements of the user devices and therefore they tend to be drained rapidly; the higher the electric power to be delivered, the faster they are drained.

Further, in order to be able to provide better power and duration performance, these batteries must be sized appropriately, installing a larger and bulkier group, consequently entailing considerably higher installation and maintenance costs.

Another disadvantage of conventional apparatuses is that if the contracted supply limit is exceeded without the electrical mains failing, the user is not aware of the considerable energy consumption and of the particularly high costs linked to this consumption; therefore, he is unlikely to reduce his electric power demand.

SUMMARY OF THE INVENTION

The aim of the present invention is to eliminate the above-mentioned drawbacks of the background art, by providing a power supply apparatus for electrical and/or electronic user devices which allows to utilize in a particularly practical and intelligent manner the energy sources available to supply the user devices, allowing to reach particularly high delivered power levels for longer periods of time than traditional types of apparatus and at the same time entailing a reduction of the costs linked to electric power consumption.

Within this aim, an object of the present invention is to provide an apparatus which is simple, relatively easy to provide in practice, safe in use, effective in operation, and has a relatively low cost.

This aim and this and other objects that will become better apparent hereinafter are achieved by the present power supply apparatus for electrical and/or electronic user devices, which comprises an uninterruptible power supply which can be connected electrically to at least one primary power source, to at least one secondary power source, and to at least one electrical and/or electronic user device to which the electric power originated from at least one of said power sources is to be delivered, characterized in that said uninterruptible power supply comprises at least one electric current management unit which is suitable to connect electrically said primary power source to said user device in order to deliver electric power up to a preset threshold value and to activate/deactivate the electrical connection of said secondary power source to said user device in order to deliver the remaining electric power absorbed by said user device.

BRIEF DESCRIPTION OF THE DRAWINGS

Further characteristics and advantages of the present invention will become better apparent from the following detailed description of a preferred but not exclusive embodiment of a power supply apparatus for electrical and/or electronic user devices, illustrated by way of non-limiting example in the accompanying drawings, wherein.

DESCRIPTION OF THE PREFERRED EMBODIMENTS

Figure 1:
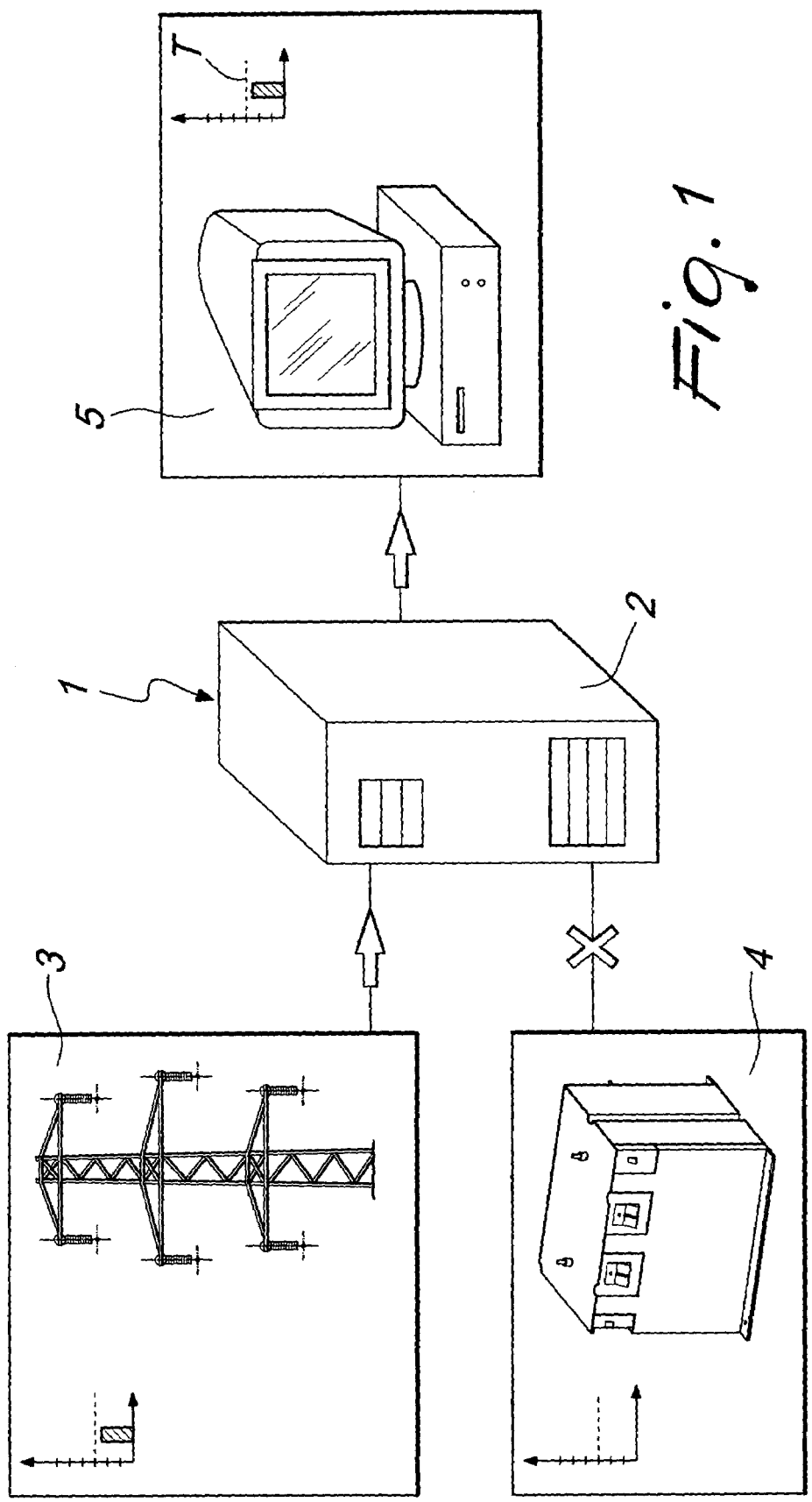
FIG. 1 is a schematic view of a first step of the operation of the apparatus according to the invention.

With reference to the figures, the reference numeral 1 generally designates a power supply apparatus for electrical and/or electronic user devices, which comprises an uninterruptible power supply 2 which can be coupled selectively, electrically to a primary power source 3, to a secondary power source 4, and to an electrical and/or electronic user device 5, to which the electric power generated by the power sources 3 and 4 is to be delivered.

Conveniently, the primary power source 3 is constituted by the ordinary electrical mains, which is nationwide and distributes power to homes, offices, industries, etc; the secondary power source 4 is instead formed by one or more rechargeable batteries, which are suitable to accumulate energy to be delivered on request.

As an alternative to batteries, the secondary power source 4 can be constituted by an electric generator, which comprises for example a diesel engine connected to an alternator or a solar panel suitable to generate electric power by photovoltaic effect.

According to the invention, the uninterruptible power supply 2 comprises an electric current management unit, not shown in detail in the figures, which is suitable to connect electrically the primary power source 3 to the user device 5 in order to allow to deliver electric power up to a preset threshold value T and to activate/deactivate the electrical connection of the secondary power source 4 to the user device 5 in order to deliver the remaining electric power absorbed by said user device.

Advantageously, the threshold value T is substantially lower than the contracted limit of maximum power which can be delivered by the electric power provider, established by the supply contracts as a function of the type of user devices to be supplied.

As is known, for example, the ENEL supply can guarantee to homes 3.2 kW of maximum deliverable power, and therefore the threshold value provided by the present invention may, preferably, be equal to 3 kW; of course, if the supplies from the electric mains are different, i.e., allow to absorb a higher or lower amount of electric power than the 3.2 kW guaranteed to homes, the threshold value can be different, while remaining lower than the contracted power limit.

The electrical current management unit provided by the uninterruptible power supply 2 is equipped with a microprocessor, which is connected to means for detecting the total electric power absorbed by the user device 5, such as a wattmeter or other suitable apparatus, which allow to monitor the energy demand of said user device in order to compare it with the threshold value.

If the electric power absorbed by the user device 5 is higher than the threshold value, the electric current management unit can activate the delivery of power by the secondary power source 4; if instead the absorbed electric power is lower than the threshold value, the batteries 4 can be disconnected from the user device 5, its energy demand being met completely by the primary power source 3.

Conveniently, the electric current management unit is further provided with electric connection means for electrical connection of the electrical mains 3 to the batteries 4, such as electric or electronic switching apparatuses, which are suitable to allow delivery of electric power on the part of the primary power source 3 in order to recharge said batteries, the sum of the electric power delivered to the user device 5 and of the electric power delivered to the batteries 4 being lower than, or at the most equal to, the threshold value.

In practice, when the batteries 4 are not required to supply the user device 5, they can be recharged by utilizing the primary power source 3, in any case in such a manner that the overall electric power delivered thereby does not exceed the preset threshold value.

The operation of the device 1 is shown schematically in the figures: in greater detail, FIG. 1 shows the present invention during an operating step in which the power required by the user device 5 is lower than the threshold value T and is supplied in full by the primary power source 3.

Figure 2:
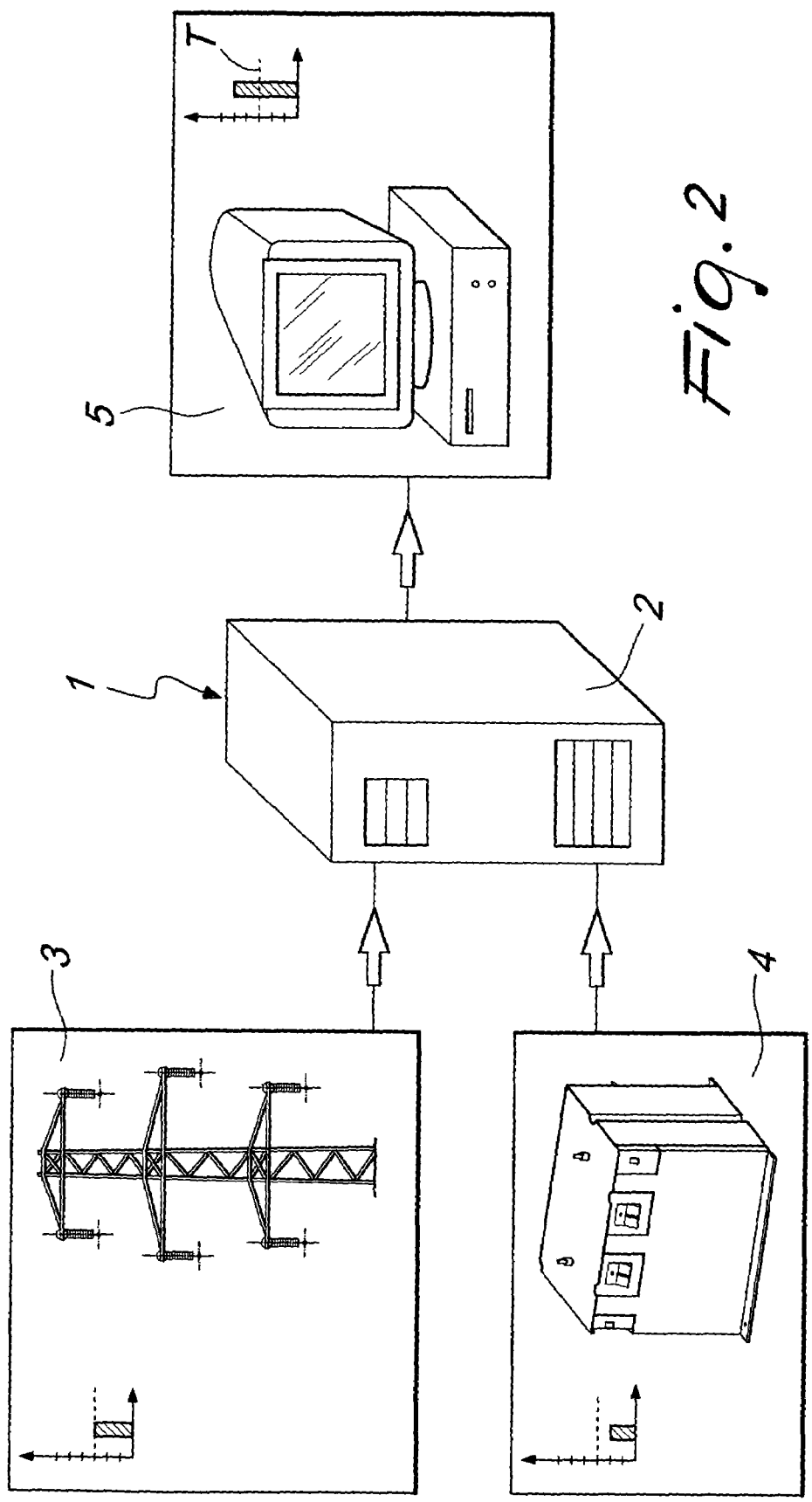
FIG. 2 is a schematic view of a second step of the operation of the apparatus according to the invention.

When the threshold value T is exceeded (FIG. 2), the uninterruptible power supply 2 allows to compensate for the higher energy demand by causing the intervention of the secondary power source 4 and limiting to the threshold value the electric power delivered by the primary source 3, so as to never exceed the contracted limit of maximum power deliverable by the ordinary electrical mains 3.

Figure 3:
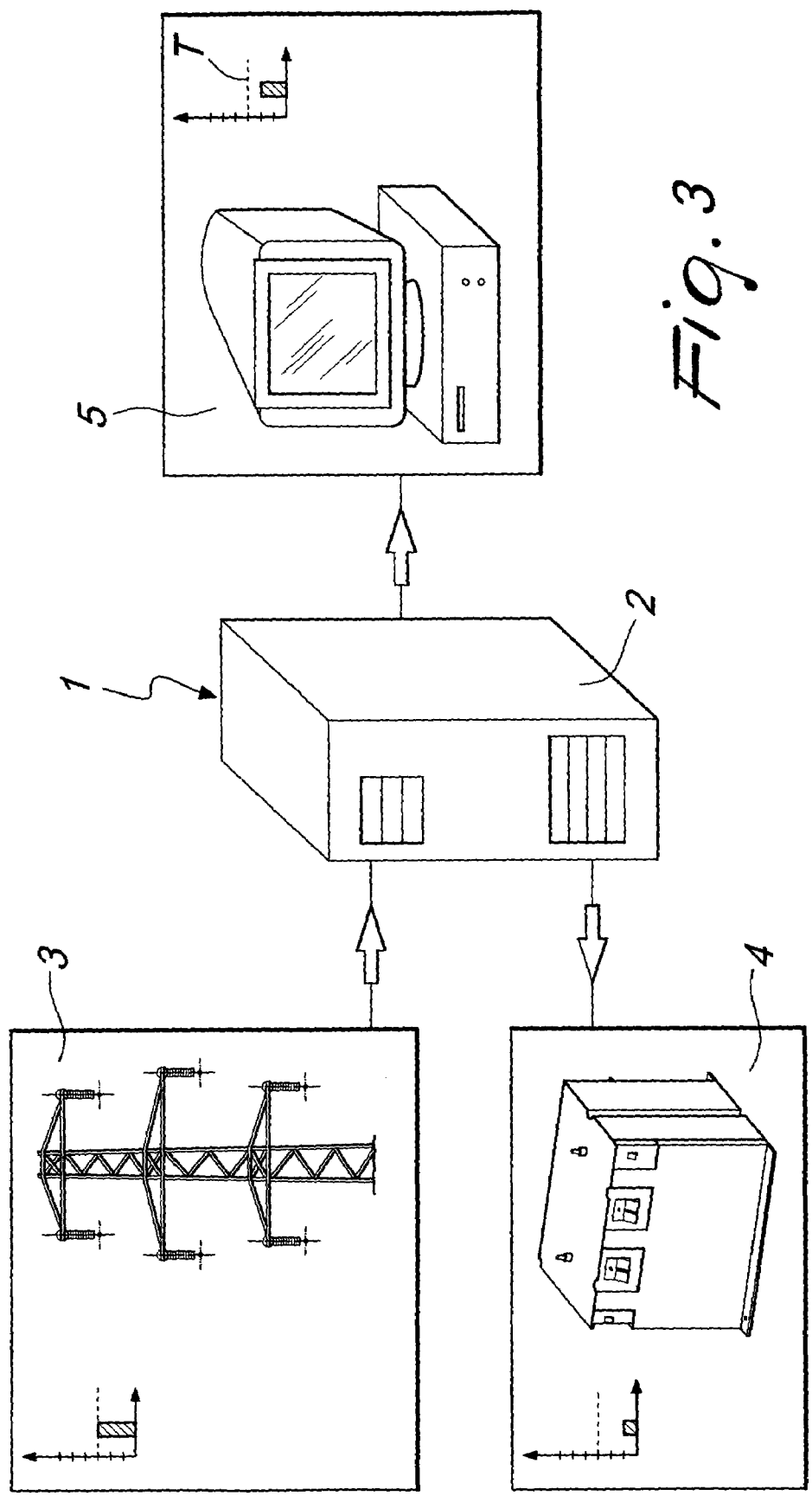
FIG. 3 is a schematic view of a third step of the operation of the apparatus according to the invention.

Finally, FIG. 3 illustrates a step of operation in which the user device 5, after being supplied by both power sources 3 and 4, again requires a supply power which is lower than the threshold value; in these circumstances, the primary power source 3 is used to deliver an amount of power equal to the threshold value, part of which is intended to supply the user device 5 and part of which is intended to recharge the batteries 4.

In practice it has been found that the described invention achieves the proposed aim and object, and in particular the fact is stressed that it allows to manage intelligently the energy sources from which the power required to supply user devices is to be drawn.

In particular, the present invention is capable of managing a primary source from which electric power is to be drawn and one or more secondary sources, which can intervene to assist the primary one in case of a sudden request for additional power by the load.

In practice, this allows to utilize fully the ordinary electrical power supply mains even if the contracted limit that sets its maximum deliverable power is particularly restrictive.

Moreover, one must not forget that the present invention allows a considerable economic saving for the user, since it prevents the energy withdrawal from the electrical mains from being such as to cause the introduction of the high rates linked to rising above the contracted supply limit.

Further, the present invention allows better utilization of the batteries, which accordingly can ensure a maximum-power and duration performance which is distinctly higher than that of traditional apparatuses of equal size.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the scope of the protection of the appended claims.

The disclosures in Italian Patent Application No. MO2004A000325 from which this application claims priority are incorporated herein by reference.

What is claimed is:

1. A power supply apparatus for electrical and/or electronic user devices, comprising: at least one primary power source; at least one secondary power source; at least one electrical and/or electronic user device to which electric power originated from at least one of said primary or secondary power sources is to be delivered; and an uninterruptible power supply which is selectively connectable electrically to said at least one primary and secondary power sources and user device, wherein said uninterruptible power supply comprises at least one electric current management unit which is suitable to connect electrically said primary power source to said user device in order to deliver electric power up to a preset threshold value and to activate/deactivate the electrical connection of said secondary power source to said user device in order to deliver a remaining electric power absorbed by said user device, wherein said primary power source is an ordinary electrical mains, said secondary power source comprises at least one rechargeable battery, and said electric current management unit comprises electric connector means for electrical connection of said primary power source to said at least one battery which are suitable to allow delivery of electric power from said primary power source in order to recharge said at least one battery, a sum of the electric power delivered to said user device and of the electric power delivered to said at least one battery being substantially lower than, or at the most equal to, said threshold value.

2. The apparatus of claim 1, wherein said electric current management unit comprises detection means for detecting electric power absorbed by said at least one user device.

3. The apparatus of claim 1, wherein said electric current management unit comprises at least one microprocessor.

4. The apparatus of claim 1, wherein said secondary power source comprises at least one electric generator.

5. The apparatus of claim 1, wherein said secondary power source comprises at least one solar panel.

6. The apparatus of claim 1, wherein said threshold value is substantially lower than a contracted limit of a maximum power that is deliverable by an electric power provider.

7. The apparatus of claim 6, wherein said threshold value is substantially equal to 3 kW.

* * * * *